United States Patent
Kang (10) Patent No.: US 7,477,625 B2
(45) Date of Patent: Jan. 13, 2009

(54) INTER-NETWORK HANDOFF METHOD

(75) Inventor: Sera Kang, Seoul (KR)

(73) Assignee: LG Nortel Co., Ltd., Seoul (KR)

( * ) Notice: Subject to any disclaimer, the term of this patent is extended or adjusted under 35 U.S.C. 154(b) by 1030 days.

(21) Appl. No.: 10/322,501

(22) Filed: Dec. 19, 2002

(65) Prior Publication Data

US 2003/0117977 A1 Jun. 26, 2003

(30) Foreign Application Priority Data

Dec. 20, 2001 (KR) ............... 10-2001-0081851

(51) Int. Cl.
*H04Q 7/00* (2006.01)

(52) U.S. Cl. ............... 370/331; 370/342; 370/441; 455/442

(58) Field of Classification Search ............... 370/331, 370/342, 441; 455/442
See application file for complete search history.

(56) References Cited

U.S. PATENT DOCUMENTS

| | | | |
|---|---|---|---|
| 6,252,861 B1 * | 6/2001 | Bernstein et al. | 370/331 |
| 6,295,452 B1 * | 9/2001 | Choi | 455/436 |
| 6,351,460 B1 * | 2/2002 | Tiedemann et al. | 370/332 |
| 6,397,043 B1 * | 5/2002 | Kang | 455/69 |
| 6,768,908 B1 * | 7/2004 | Jalloul et al. | 455/442 |
| 6,810,253 B2 * | 10/2004 | Lee et al. | 455/436 |
| 6,834,190 B1 * | 12/2004 | Lee et al. | 370/331 |
| 6,990,088 B2 * | 1/2006 | Madour | 370/331 |
| 7,110,785 B1 * | 9/2006 | Paranchych et al. | 370/333 |
| 7,130,285 B2 * | 10/2006 | Chang | 370/331 |
| 7,133,676 B2 * | 11/2006 | Iguchi et al. | 455/442 |

* cited by examiner

*Primary Examiner*—Edan Orgad
*Assistant Examiner*—Jay P Patel
(74) *Attorney, Agent, or Firm*—KED & Associates, LLP

(57) ABSTRACT

An inter-network handoff system and method are disclosed, and include determining, by a setting BS, whether or not there exists a pilot stronger than a threshold value according to a PSMM received from a mobile station (MS), selecting a BS of which pilot is stronger than the threshold value as a target BS, determining whether or not the MS can accommodate a packet data service provided by the target BS, configuring the MS so as to accommodate the packet data service of the target BS, starting communication between the MS and the target BS, and terminating communication between the MS and the serving BS. Accordingly, a soft handoff can be performed between two systems having different data rates.

19 Claims, 6 Drawing Sheets

INTER-NETWORK HANDOFF METHOD

BACKGROUND OF THE INVENTION

1. Field of the Invention

The present invention relates to wireless communication systems, and in particular to an inter-network handoff method in a code-division multiple access (CDMA) communication system.

2. Background of the Related Art

In the field of wireless communications, several technology-based standards exist for controlling communications between a mobile station (MS) and a base station (BS). Among them, the Telecommunications Industry Association/Electronic Industries Association (TIA/EIA) Interim Standard IS-95 series, i.e., IS-95A, IS-95B, and IS-95C (CDMA2000), are digital-based cellular standards entitled "Mobile Station-Base Station Compatibility Standard for Dual-Mode Wideband Spread Spectrum Cellular System."

An MS using IS-95 series standards constantly searches a Pilot Channel of neighboring BS's for a pilot signal that is sufficiently stronger than a prescribed threshold value. As the MS moves from a region covered by one BS to another, the MS promotes certain pilots from a Neighbor Set to a Candidate Set via a Pilot Strength Measurement Message (PSMM). The BS determines an Active Set of pilot signals according to the PSMM, and notifies the MS of the new Active Set via a Handoff Direction Message (HDM).

Of the various types of handoffs, a soft handoff occurs when the MS starts communication with a new BS in the new Active Set before terminating communications with the old BS. When, on the other hand, the MS starts communication with a new BS in the new Active Set after terminating communications with the old BS, a hard handoff has occurred.

The IS-95A standard was essentially developed for voice communication, and included a maximum single bandwidth of 14.4 Kbps, which was sufficient for voice communication.

Recently, the need for mobile data communication has grown in addition to the need for voice communication, the IS-95 standard has been continuously modified to IS-95B and IS-95C. These improvements provide high speed data services. For example, IS-95b works at 64 Kbps and the IS-95C works at 128 Kbps.

The IS-95B brought improvements over the IS-95A in data transmission speed by occupying 8 traffic channels, so as to support 64 Kbps in circuit service and 115.2 Kbps in packet service. These speeds are 8 times faster than the 8 Kbps and 14.4 Kbps of the IS-95A in respective circuit and packet services.

The IS-95C standard is the most recent version of the IS-95 series, and supports data speeds of up to 144 Kbps, which is the minimum data rate of for IMT-2000.

Generally, a higher version technique is designed to be backward-compatible with lower versions. This is done to protect the current infrastructure investments and experience. Thus, the IS-95C is substantially backward-compatible with the IS-95A/B and other related standards.

However, even though the IS-95C is backward-compatible with the IS-95A/B in voice communications, it is not backward compatible in the data communication. This is due to the large difference between the data rates of the IS-95A/B and IS-95C networks.

Accordingly, in an environment where the IS-95A, IS-95B, and IS-95C networks having different bandwidths coexist, the traffic channels are disconnected when the handoff occurs from the IS-95C network to the IS-95A or IS-95-B network because the IS-95A/B do not support the high date rate of the IS-95C.

Additionally, since the IS-95A/B systems do not support a Fast Forward Power Control, the IS-95A/B systems cannot efficiently perform power control even when the handoff is completed from the IS-95C system to IS-95A/B system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide an inter-network handoff method capable of maintaining connection when the MS moves from one network to another, each supporting different data rate.

It is another object of the present invention to provide an inter-network handoff method allowing stable and reliable data communication when an MS moves from an IS-95C-based system supporting high data rate to IS-95A/B-based system supporting a low data rate without data communication disconnection.

It is another object of the present invention to provide an inter-network handoff method capable of allowing the IS-95A/B system to perform stable power control after completing a handoff from the IS-95C system to an IS-95A/B system.

To achieve at least the above objects in whole or in parts, there is provided an inter-network handoff method including (a) determining whether or not a handoff from a serving base station (BS), which is providing a high data rate service to a mobile station (MS), to a target BS, which supports lower rate data service relative to the serving BS, is required by analyzing a Pilot Strength Measurement Message (PSMM) received from the MS; (b) determining whether or not the MS can accommodate the data rate service of the target BS when the handoff is required; and (c) performing the handoff when the MS can accommodate the data rate service of the target BS.

The step (a) preferably includes determining whether or not there exists a pilot, in the PSMM, of which value is greater than a threshold value, determining a BS corresponding to the pilot as the target BS; and retrieving supplemental channels (SCH) assigned to the MS after the target BS is determined.

The step (b) preferably includes suggesting the data service supported by the target BS to the MS through a service request message (SRQM) and acknowledging, by the MS, an accept of the target BS data service through a service response message (SRPM).

In one embodiment of the present invention, step (c) preferably includes sending, by the serving BS, information on a service configuration, radio configuration, and a PN code of the target BS to the MS through an universal handoff direction message (UHDM); acknowledging, by the MS, reception of the UHDM through an UHDM_Ack; completing handoff by resetting parameters of the MS in accordance with the service configuration, radio configuration, and PN code of the target BS; and informing the target BS of completion of handoff through a handoff complete message (HCM).

In another embodiment of the present invention, step (c) preferably includes sending service configuration and radio configuration information of the target BS to the MS through a Service Connection Message (SCM); acknowledging, by the MS, reception of the SCM through a Service Connection Complete Message (SCCM); informing the MS of the PN code of the target BS through an Universal Handoff Direction Message (UHDM); acknowledging, by the MS, reception of the PN code through a UNDM_Ack; informing the target BS of the handoff completion using the handoff complete message (HCM).

A maximum data rate (MDR) option of the service configuration is preferably set so as to be nearest to the data rate supported by the target BS. The target BS preferably performs the power control using a Power Measurement Report Message (PMRM) or Erasure Indicator Bit (EIB) after receiving the HCM. Also, the target BS preferably sends parameters required for the power control to the MS through a Power Control Parameter Message (PCPM) when the target BS performs the power control using the PMRM.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Preferred embodiments of the present invention will be described hereinafter with reference to the accompanying drawings.

According to the preferred embodiment, when an MS moves from a region covered by an IS-95C system (serving BS) to another region covered by an IS-95A/B system (target BS), the serving BS determines a handoff based on the Pilot Strength Measurement Message (PSMM) received from the MS, and suggests a packet data service provided by the IS-95A/B system by sending a Service Request Message (SRQM) to the MS. If the MS receives the SRQM from the serving BS, the MS responds to the SRQM by sending a Service Response Message (SRPM) for accepting the IS-95A/B packet data service.

When the serving BS receives the SRPM from the MS, the serving BS sends information regarding the target BS, such as a new service configuration, radio configuration (RC) of the IS-95A/B, protocol revision, and Pseudo Noise (PN) code, for example, via a handoff direction message (HDM).

Consequentially, if the MS receives the HDM, the MS is initialized with the parameters for accommodating the new IS-95A/B packet data service. The MS then sends a handoff complete message (HCM) to the target BS so as to complete the handoff to the IS-95A/B system.

Figure 1A:
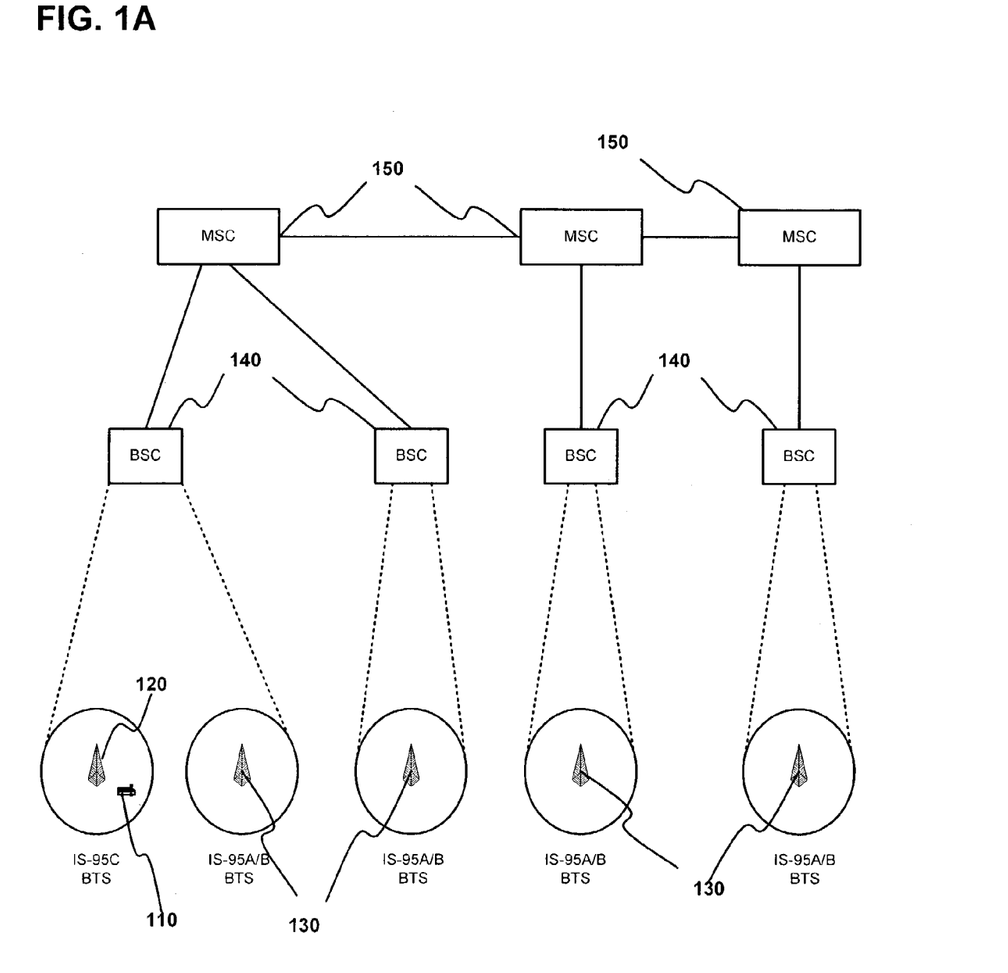
FIG. 1A is a schematic view illustrating an upgraded 3rd generation mobile communication system.
Figure 1B:
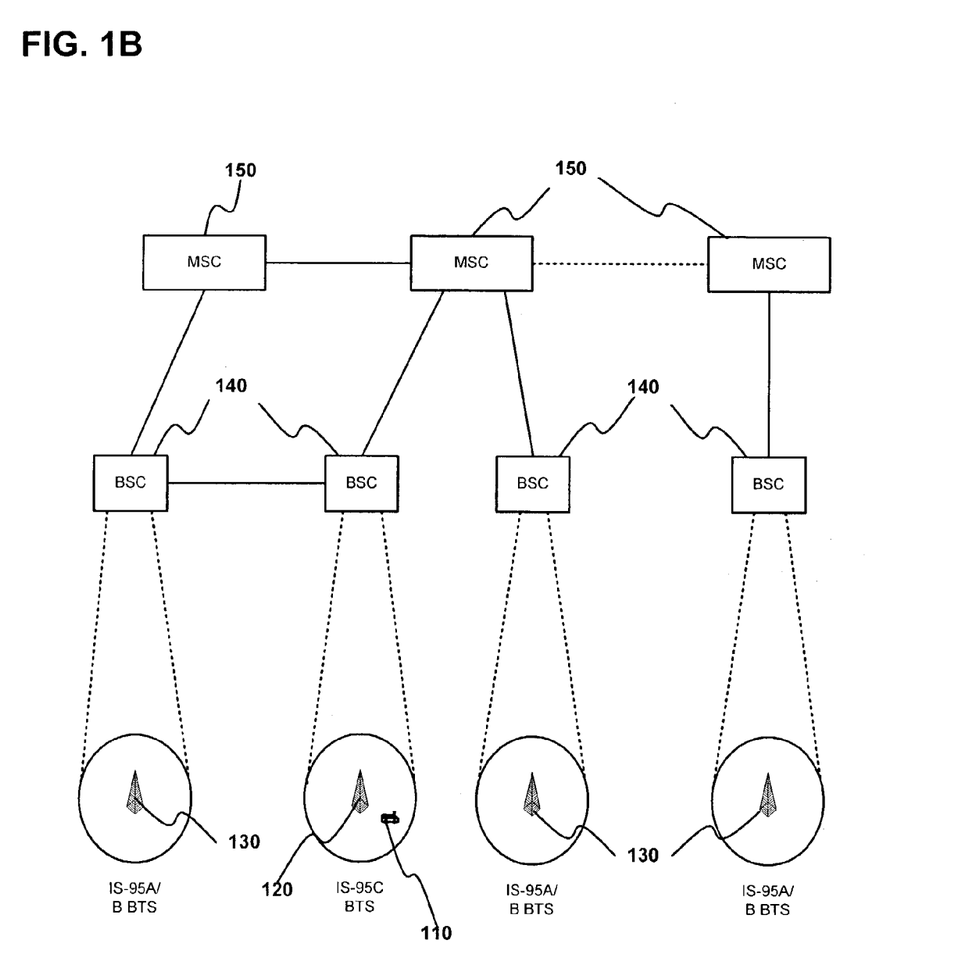
FIG. 1B is a schematic view illustrating an overlay 3rd generation mobile communication system.

FIGS. 1A and 1B respectively show an upgrade and an overlay type of 3rd generation mobile communication networks to which the inter-network handoff method of the preferred embodiment is applied. As shown in FIGS. 1A and 1B, the 3rd generation communication network preferably includes a plurality of IS-95A/B systems 130 and IS-95C systems 120 communicating with MS 110. They additionally include a plurality of base station controllers (BSCs) 140 for controlling the IS-95A/B and IS-95C systems 130 and 120, and mobile switching centers (MSC) 150 communicating with the BSCs 140 for call control.

In the mixed system environments of FIGS. 1A and 1B, the inter-network handoff method of the preferred embodiment supports a soft handoff between the IS-95A/B system 130 and IS-95C system 120 when the MS 110 moves from the IS-95C system service area to the IS-95A/B system 130 service area even while the MS 110 is receiving the high rate data service from the IS-95C system 120.

Figure 2:
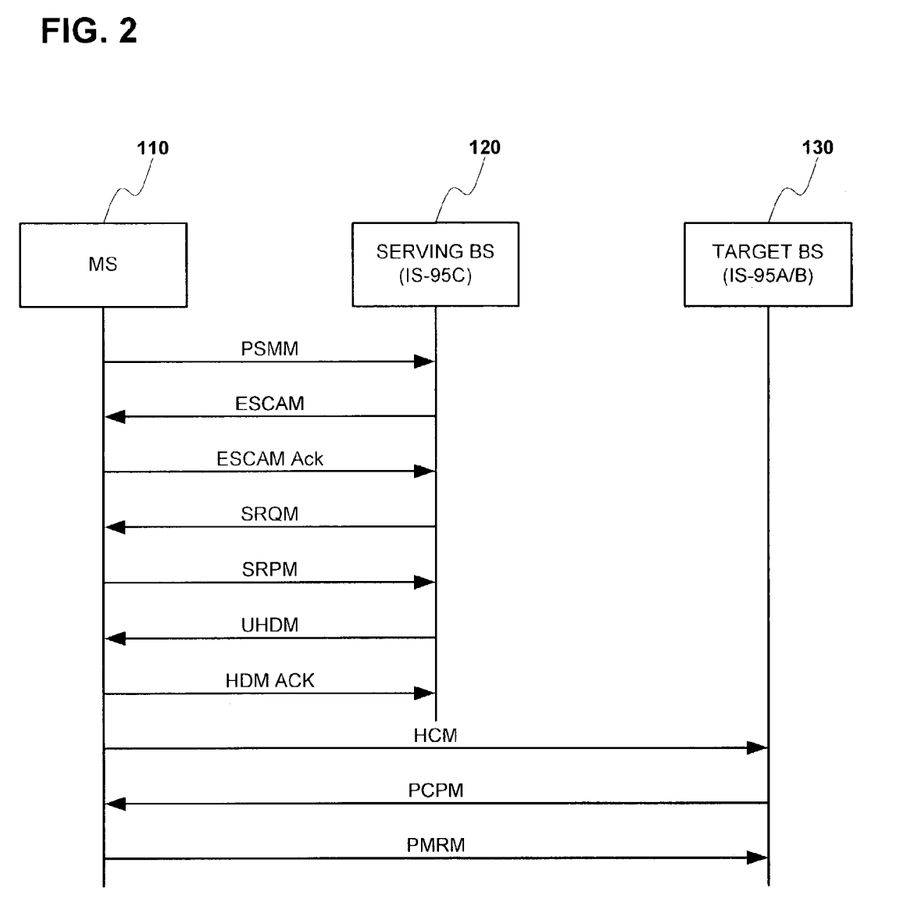
FIG. 2 is a signaling diagram illustrating an inter-network handoff method according to a first preferred embodiment of the present invention.

FIG. 2 is a signaling diagram illustrating an inter-network handoff method according to a first preferred embodiment of the present invention. As shown in FIG. 2, it is assumed that the MS 110 moves to the service area of the target BS (IS-95A/B system) 130 while communicating data at a high data rate in service area of the serving BS (IS-95C system) 120.

Referring to FIG. 2, the serving BS 120 first determines whether or not a handoff to the target BS 130 is required based on the PSMM periodically received from the MS 110. If it is determined that a handoff is required, the serving BS 120 sends an Extended supplemental channel assign message (ESCAM) to the MS 110 to retrieve supplemental channels assigned to the MS 110. If an ESCAM Ack is received in response to the ESCAM, the serving BS 120 sends the SRQM to the MS 110 to indicate that the target BS 130 is an IS-95A/B system. The MS 110 can thereby prepare to accommodate the IS-95A/B packet data service at step S102.

If the MS 110 can accommodate IS-95A/B packet data service, the MS 110 sends the SRPM to the serving BS 120 to indicate that the MS 110 can accommodate the IS-95A/B packet data service, in response to the SRQM.

On receiving the SRPM from the MS 110, the serving BS 120 sends information related to the target BS 130 to the MS 110. This information includes service configuration and radio configuration (RC) parameters, Pseudo Noise (PN) code, and others, and is sent using a Universal Handoff Direction Message (UHDM), which is used in the IS-95C network.

If the MS 110 receives the UHDM, the MS 110 prepares a handoff to the target BS 130, and sends an HDM ACK to the serving BS 120. The MS 110 also sends a Handoff Complete Message (HCM), which indicates that the handoff is successfully performed, to the target BS 130 such that the handoff from the IS-95C system to the IS-95A/B system is complete without terminating communication with the IS-95C system before starting communication with the IS-95A/B. After the handoff is complete, the MS 110 communicates data with the target BS 130 at the IS-95A/B-supporting data rate (low data rate).

During the handoff procedure, the MS 110 refers to the maximum SCCH number (MAX_SCCH_No) of the service configuration information and set the data rate nearest to the data rate supported by IS-95C packet data service.

Figure 3:
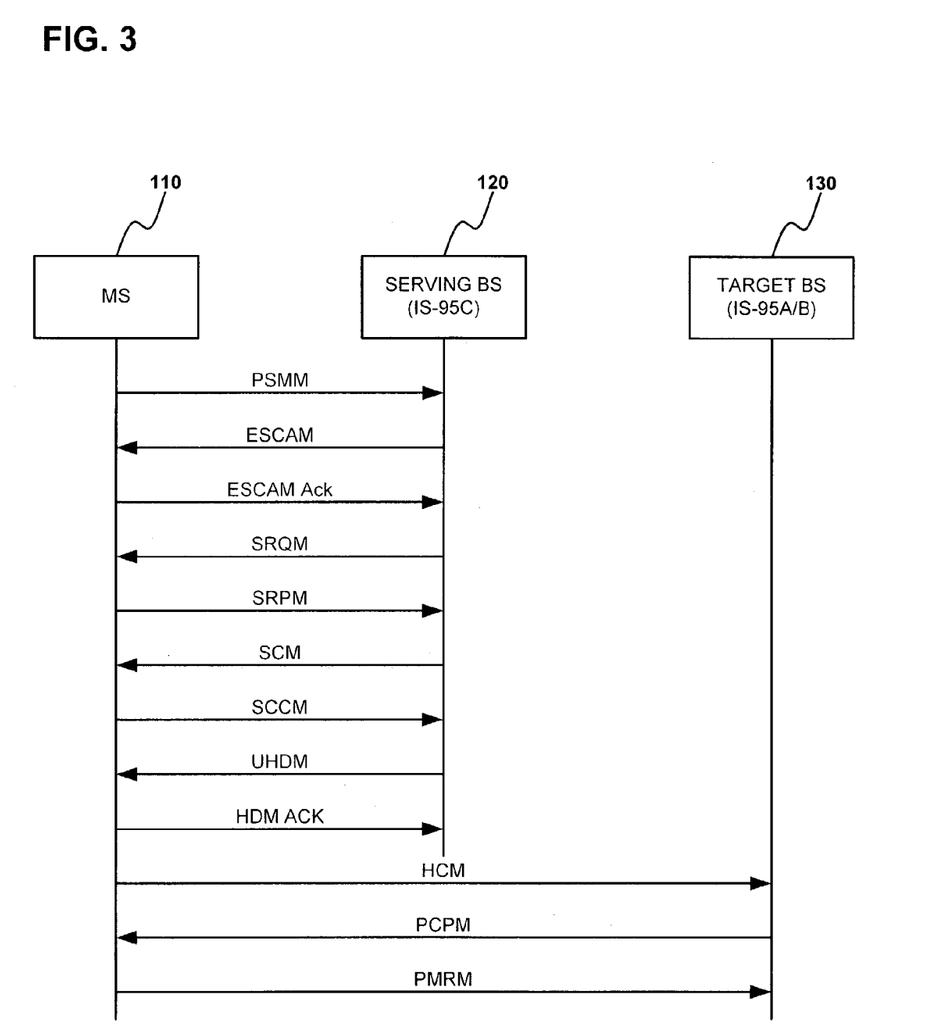
FIG. 3 is a signaling diagram illustrating an inter-network handoff method according to a second preferred embodiment of the present invention.

FIG. 3 is a signaling diagram illustrating an inter-network handoff method according to a second preferred embodiment of the present invention.

As shown in FIG. 3, it is assumed that the MS 110 moves to a region covered by the target BS (IS-95A/B system) 130 while communicating data at a high data rate in the region of the serving BS (IS-95C system) 120. The serving BS 120 first determines whether or not a handoff to the target BS 130 is required based on the PSMM periodically received from the MS 110. If it is determined that a handoff is required, the serving BS 120 sends an ESCAM to the MS 110 so as to retrieve the supplemental channels assigned to the MS 110. If an ESCAM Ack is received from the MS 110, the serving BS 120 sends the SRQM to the MS 110 to indicate that the target BS 130 is an IS-95A/B system. The MS 110 can thereby prepare to accommodate the IS-95A/B packet data service.

If the MS 110 can accommodate IS-95A/B packet data service, the MS 110 prepares a handoff to the target BS 130 and sends the SRPM to the serving BS in response to the SRQM to indicate that the MS 110 can accommodate the IS-95A/B packet data service.

Upon receiving the SRPM from the MS 110, the serving BS 120 sends the MS 110 information related to the target BS 130, including service configuration and radio configuration O(C), using a Service Connection Message (SCM).

In response to the SCM, the MS 110 sends a Service Connection Complete Message (SCCM) to the serving BS 130 to acknowledge receipt of the SCM. The serving BS 120 then responsively sends the MS 110 the UHDM indicating the PN code of the target BS 130.

If the MS 110 receives the UHDM, the MS 110 sends an HDM ACK to the serving BS 120, and then sends a Handoff Complete Message (HCM) to the target BS 130. The handoff from the IS-95C system to the IS-95A/B system is thus performed without terminating communication with the IS-95C system before starting communication with the IS-95A/B. After the handoff is complete, the MS 110 communicates data with the target BS 130 at the IS-95A/B-supporting data rate (low data rate).

During the handoff procedure, the MS 110 preferably refers to a maximum SCCH number (MAX_SCCH_No) of the service configuration information and sets the data rate nearest to the data rate supported by IS-95C packet data service.

If the serving BS (IS-95C system) 120 is performing a fast forward power control (ffpc), the target BS 130 performs power control using a Power Measurement Report Message (PMRM) or an Erasure Indicator Bit (EIB) after receiving the PCM. For power control using the PMRM, the target BS 130 sends the MS 110 parameters required for the power control through a Power Control Parameter Message (PCPM).

Figure 4:
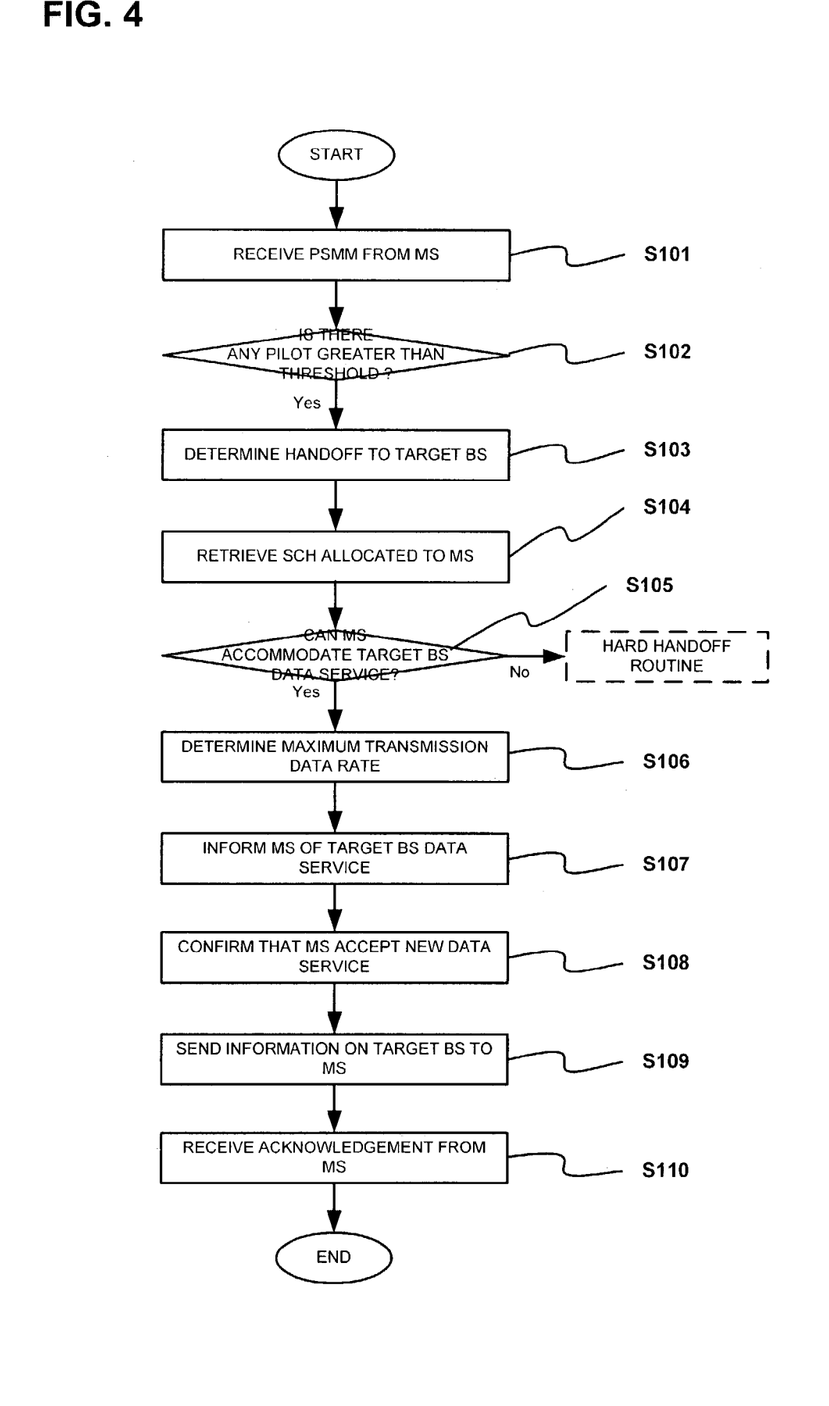
FIG. 4 is a flowchart for illustrating a procedure during the inter-network handoff at a serving BS.
Figure 5:
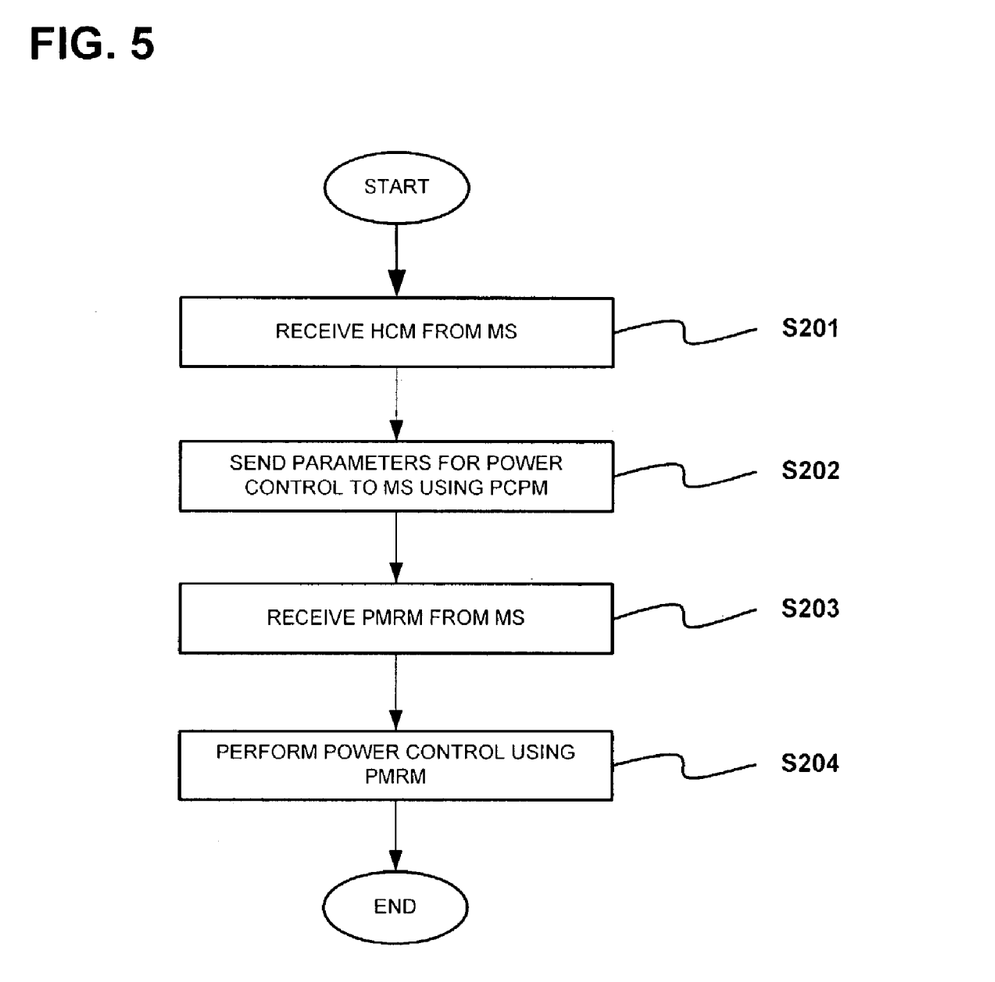
FIG. 5 is a flowchart for illustrating a procedure during the inter-network handoff at a target BS.

FIGS. 4 and 5 are flowcharts illustrating the inter-network handoff method according to the preferred embodiment.

As shown in FIG. 4, the serving BS 120 receives the PSMM, which is periodically broadcasted from the MS 110, at step S101. The serving BS 120 analyses the PSMM to determine whether or not the handoff is required, at step S102. If, at step S103, it is determined that the handoff to a target BS 130, the serving BS 120 sends the ESCAM to the MS 110 for retrieving the supplemental channel assigned to the MS 110, at step S104.

If the ESCAM_Ack is received in response to the ESCAM, the serving BS 120 retrieves the supplemental channels and determines whether or not the MS 110 can accommodate the IS-95C data service, at step S105. If the MS 110 can accommodate the IS-95C data service, the serving BS 120 sets the maximum data rate nearest to the IS-95C supported data rate, at step S106. The serving BS 120 then informs the MS 110 of the maximum data rate, at step S107. If it is confirmed that the MS 110 can accommodate the maximum data rate at step S108, the serving BS 120 sends the information on the target BS 130 to the MS 110, at step S109. After receiving the information about the target BS 130, the MS 110 sends an acknowledge message to the serving BS 120, at step S110, and then sends the handoff complete message to the target BS.

Next, as shown in FIG. 5, if the handoff complete message is received at step S201, the target BS 130 sends the parameters required for the power control to the MS 110 at step S202, and performs power control using the PMRM periodically received from the MS 110.

As described herein, the preferred embodiment has many advantages. For example, since the inter-network handoff method is provided with an enhanced handoff function in which the handoff occurs without channel disconnection between the MS and the serving BS especially when the MS moves from one system to another supporting different data rates, it is possible to perform a soft handoff during the high speed data communication as well as the conventional voice communication, resulting in stable and reliable data communication. Additionally, stable power control can be achieved after such a handoff.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is

1. A method of performing an inter-network handoff, comprising:

determining whether or not a handoff of a Mobile Station (MS) is required from a serving base station (BS) to a target BS by analyzing a Pilot Strength Measurement Message (PSMM) received from the MS where the serving BS provides a first data rate service to the MS and the target BS supports a second data rate service, the first date rate being greater than the second date rate;

determining whether or not the MS can accommodate the second data rate service of the target BS when it is determined that the handoff is required;

receiving, from the MS, information of supplemental channels (SCH) assigned to the MS, wherein receiving the information of the SCH includes:

requesting, by the serving BS, a SCH retrieval through an extended supplemental channel assignment message (ESCAM), and acknowledging, by the MS, the SCH retrieval through an ESCAM_Ack in response to the ESCAM; and performing the handoff when the MS can accommodate the second data rate service of the target BS;

completing the handoff by resetting parameters of the MS; and informing the target BS of completion of the handoff through a handoff complete message (HCM), wherein the target BS performs power control using one of a Power Measurement Report Message (PMRM) and an Erasure Indicator Bit (EIB) after receiving the HCM.

2. The method of claim 1, wherein the handoff is of a data service call.

3. The method of claim 2, wherein the first data rate service is IS-95C and wherein the second data rate service is one of IS-95A and IS-95B.

4. The method of claim 1, wherein determining whether or not the handoff is required comprises:
   determining whether or not there exists a pilot in the PSMM, having a value that is greater than a threshold value; and
   determining a BS corresponding to the determined pilot as the target BS.

5. The method of claim 4, wherein the information related to the SCH assigned to the MS is received after the target BS is determined.

6. A method of performing an inter-network handoff, comprising:
   determining whether or not a handoff of a Mobile Station (MS) is required from a serving base station (BS) to a target BS by analyzing a Pilot Strength Measurement Message (PSMM) received from the MS where the serving BS provides a first data rate service to the MS and the target BS supports a second data rate service, the first date rate being greater than the second date rate;
   determining whether or not the MS can accommodate the second data rate service of the target BS when it is determined that the handoff is required; and
   performing the handoff when the MS can accommodate the second data rate service of the target BS, wherein determining whether or not the MS can accommodate the second data rate service comprises:
      identifying the data service supported by the target BS to the MS through a service request message (SRQM); and
      acknowledging, by the MS, an acceptance of the target BS data service through a service response message (SRPM).

7. The method of claim 1, wherein performing the handoff comprises:
   sending, by the serving BS, information on a service configuration, radio configuration, and PN code of the target BS to the MS through an universal handoff direction message (UHDM); and
   acknowledging, by the MS, reception of the UHDM through an UHDM_Ack.

8. The method of claim 7, wherein the handoff is completed by resetting the parameters of the MS in accordance with the service configuration, radio configuration, and PN code of the target BS.

9. The method of claim 8, wherein a maximum data rate (MDR) option of the service configuration is set to be nearest to the second data rate supported by the target BS.

10. The method of claim 1, wherein the target BS sends the parameters required for the power control to the MS through a Power Control Parameter Message (PCPM) when the target BS performs the power control using the PMRM.

11. A method of performing an inter-network handoff, comprising:
   determining whether or not a handoff of a Mobile Station (MS) is required from a serving base station (BS) to a target BS by analyzing a Pilot Strength Measurement Message (PSMM) received from the MS where the serving BS provides a first data rate service to the MS and the target BS supports a second data rate service, the first date rate being greater than the second date rate;
   determining whether or not the MS can accommodate the second data rate service of the target BS when it is determined that the handoff is required; and
   performing the handoff when the MS can accommodate the second data rate service of the target BS, wherein performing the handoff comprises:
      sending service configuration and radio configuration information of the target BS to the MS through a Service Connection Message (SCM); and
      acknowledging, by the MS, reception of the SCM through a Service Connection Complete Message (SCCM).

12. The method of claim 11, further comprising:
   informing the MS of the PN code of the target BS through an Universal Handoff Direction Message (UHDM); and
   acknowledging, by the MS, reception of the PN code through a UNDM_Ack.

13. The method of claim 12, wherein the service configuration information includes a maximum data rate (MDR) option set nearest to a data rate supported by the target BS.

14. The method of claim 6, further comprising informing the target BS of the handoff completion using a handoff complete message (HCM).

15. The method of claim 14, wherein the target BS performs power control using one of a Power Measurement Report Message (PMRM) and an Erasure Indicator Bit (EIB) after receiving the HCM.

16. The method of claim 15, wherein the target BS sends parameters required for the power control to the MS through a Power Control Parameter Message (PCPM) when the target BS performs the power control using the PMRM.

17. A mobile communication system, comprising:
   a first base station configured to provide data service to a mobile station at a first data rate; and
   a second base station configured to provide data service to the mobile station at a second data rate, the first data rate being greater than the second data rate, wherein a soft handoff between the first base station and the second base station is performed by retrieving supplemental channels assigned to the mobile station by the first base station sending an extended supplemental channel assignment message to the mobile station and the mobile station acknowledging supplemental channel retrieval during an extended supplemental channel assignment message acknowledgment, wherein the soft handoff is further performed by determining whether the mobile station can accommodate the second data rate, sending service information regarding the second base station to the mobile station, and completing the handoff by resetting parameters of the mobile station in accordance with a service information of the second base station, wherein the second base station performs power control using one of a Power Measurement Report Message and an Erasure Indicator Bit after determining that the handoff is complete.

18. The system of claim 17, wherein the service information comprises service configuration information, radio configuration information, and a PN code of the second base station.

19. The system of claim 18, wherein the service configuration information comprises a maximum data rate option set nearest to a data rate supported by the second base station.

* * * * *